(12) United States Patent
Mazzilli

(10) Patent No.: US 6,333,759 B1
(45) Date of Patent: Dec. 25, 2001

(54) 360 ° AUTOMOBILE VIDEO CAMERA SYSTEM

(76) Inventor: Joseph J. Mazzilli, 57-67 Cloverside Blvd., Bayside, NY (US) 11364

( * ) Notice: Subject to any disclaimer, the term of this patent is extended or adjusted under 35 U.S.C. 154(b) by 0 days.

(21) Appl. No.: 09/494,060

(22) Filed: Jan. 28, 2000

Related U.S. Application Data

(60) Provisional application No. 60/124,624, filed on Mar. 16, 1999.

(51) Int. Cl.$^7$ .............................. H04N 7/18; H04N 9/47
(52) U.S. Cl. .................................... 348/148; 348/153
(58) Field of Search ................................ 348/118, 148, 348/153, 159, 151, 36, 143; 224/556, 564, 563, 543; 396/429, 502; 352/131, 132; H04N 7/18, 9/47

(56) References Cited

U.S. PATENT DOCUMENTS

| | | |
|---|---|---|
| 4,093,364 | 6/1978 | Miller . |
| 4,167,756 | 9/1979 | Smith . |
| 4,345,819 * | 8/1982 | Villa-Real ............................ 359/865 |
| 4,420,238 | 12/1983 | Felix . |
| 4,514,068 | 4/1985 | Urquhart . |
| 4,789,904 | 12/1988 | Peterson . |
| 4,843,463 | 6/1989 | Michetti . |
| 4,978,984 | 12/1990 | Brookfield . |
| 5,096,287 * | 3/1992 | Kakinami et al. .................... 353/131 |
| 5,111,289 | 5/1992 | Lucas et al. . |
| 5,144,661 | 9/1992 | Shamosh et al. . |
| 5,181,120 | 1/1993 | Hickey et al. . |
| 5,223,872 | 6/1993 | Stiepel . |
| 5,260,731 * | 11/1993 | Baker, Jr. ............................ 224/556 |
| 5,289,321 * | 2/1994 | Secor .................................. 348/118 |
| 5,495,971 * | 3/1996 | Holliday ............................. 224/563 |
| 5,539,483 * | 7/1996 | Nalwa ................................ 348/36 |
| 5,542,238 | 8/1996 | Johnson et al. . |
| 5,568,211 * | 10/1996 | Bamford ............................. 396/429 |
| 5,627,616 | 5/1997 | Sergeant et al. . |
| 5,642,238 | 6/1997 | Sala . |
| 5,666,157 | 9/1997 | Aviv . |
| 5,729,016 | 3/1998 | Klapper et al. . |
| 5,774,569 | 6/1998 | Waldenmaier . |
| 5,793,420 * | 8/1998 | Schmidt ............................. 348/151 |
| 5,812,252 | 9/1998 | Bowker et al. . |
| 5,835,613 | 11/1998 | Breed et al. . |
| 5,845,000 | 12/1998 | Breed et al. . |
| 5,886,738 | 3/1999 | Hallenbeck et al. . |
| 6,002,326 * | 12/1999 | Turner ............................... 348/148 |
| 6,008,841 * | 12/1999 | Charlson ............................ 348/148 |
| 6,064,430 * | 5/2000 | Lefkowitz .......................... 348/151 |

* cited by examiner

Primary Examiner—Howard Britton
Assistant Examiner—Nhon T Diep

(57) ABSTRACT

The present invention relates to a video camera system which has a 360° range for video recording inside and outside of an automotive vehicle.

18 Claims, 2 Drawing Sheets

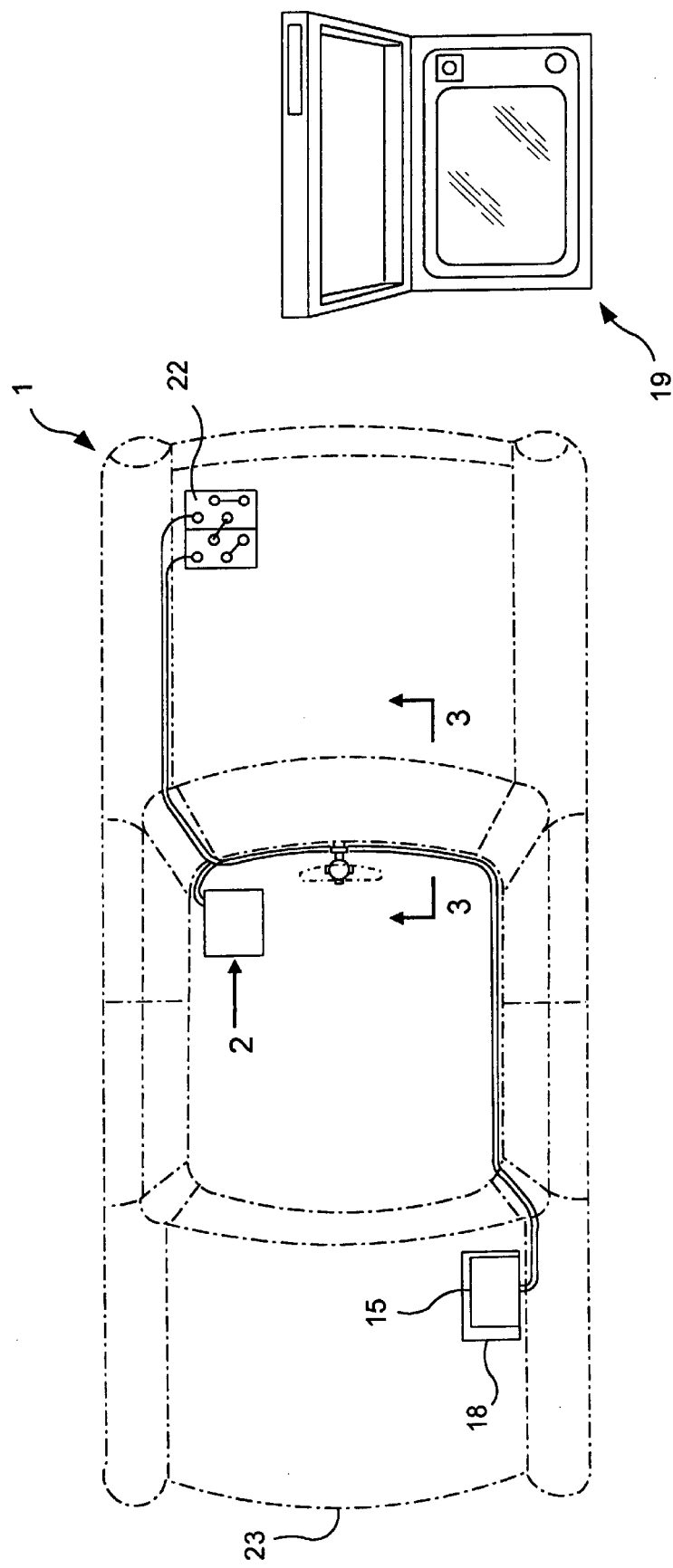

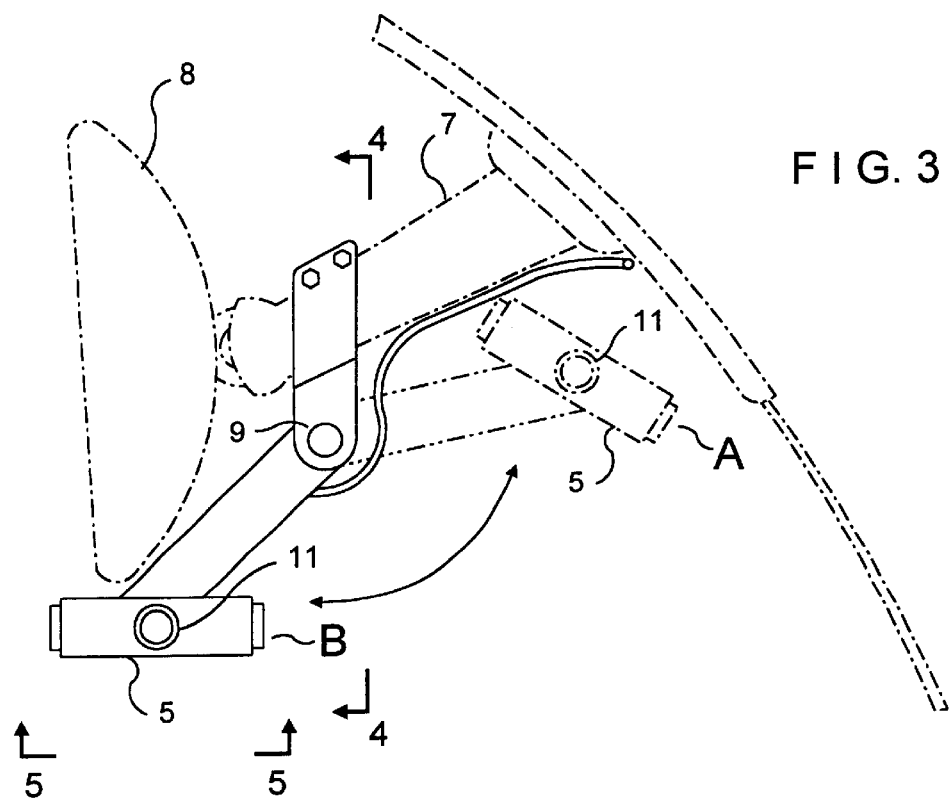
FIG. 3
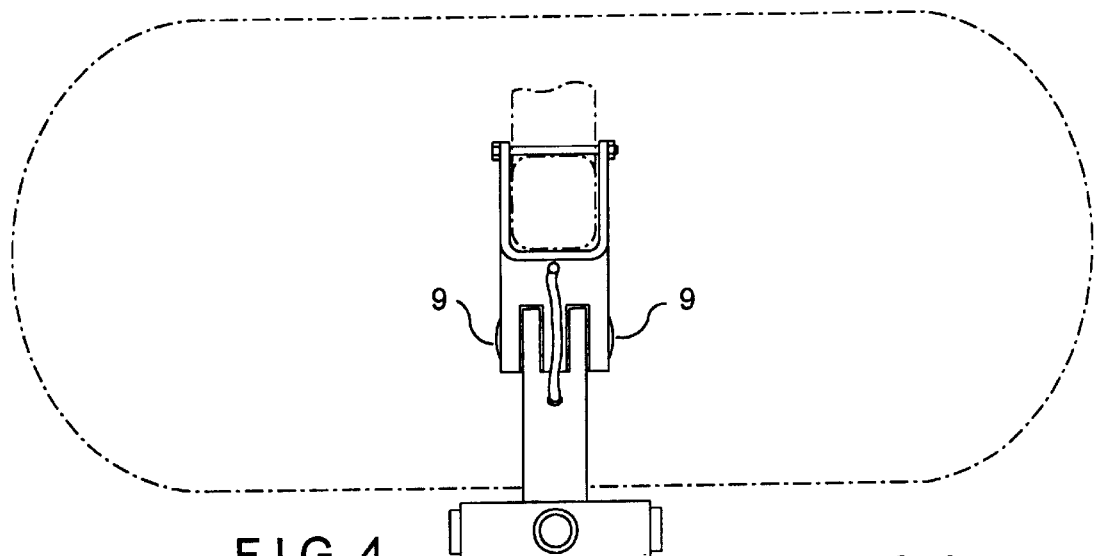
FIG. 4
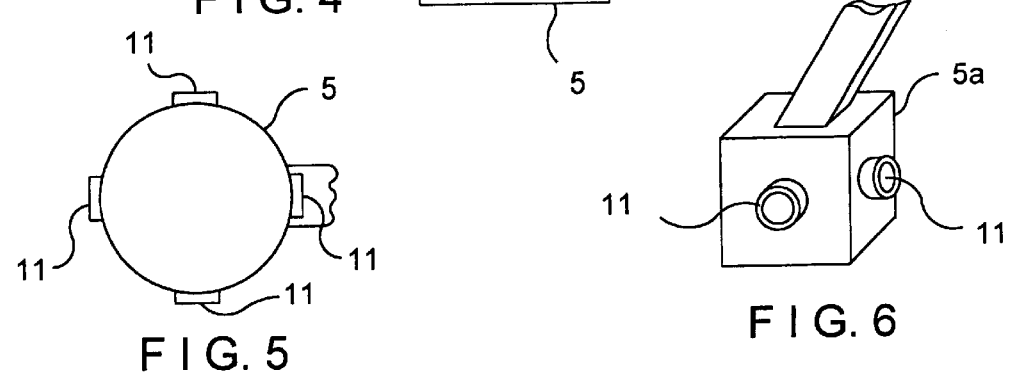
FIG. 5
FIG. 6

360° AUTOMOBILE VIDEO CAMERA SYSTEM

RELATED APPLICATION

The present application is a continuation in part application of Provisional U.S. Patent Application Ser. No. 60/124,624 filed on Mar. 16, 1999 and claims priority thereof.

BACKGROUND OF THE INVENTION

1. Field of the Invention

The present invention relates to a video camera system in an automobile. In particular the present invention relates to a video camera which has a 360° range for video recording inside and outside of an automotive vehicle and thereby providing documentation for police officers or vehicle owners.

2. The Prior Art

The use of videotaping systems for an automobile is known. U.S. Pat. No. 4,78,904 relates to a vehicle mounted surveillance system. The system has a camera and a control head inside a police vehicle and a video recorder in a bullet proof, fire proof vault of the vehicle.

The system is used as a surveillance system to videotape located in the trunk of a vehicle.

It would be preferred to have a system with a 360° range for video taping a 360° area simultaneously thus videotaping both inside and outside of the vehicle. It would be preferable to be able to retract the camera when not in use.

SUMMARY OF THE INVENTION

It is a principal object of the present invention to provide a video camera system for documentary videotaping in a 360° range around the camera's location.

It is another object to provide a 360° range camera to be located behind and underneath the rear view mirror of an automobile vehicle.

It is a further object to VCR (video-cassette recorder) for ready image.

It is another object to provide a commercial VCR system which operates off the automotive vehicle's battery.

It is still another object to locate the multiplexer and VCR either inside a glove compartment or a trunk of the automotive vehicle.

It is a further object to provide a video camera system which provides a 360 degree simultaneous video taping documentation for police officers to serve as evidence for appropriate situations when vehicles and/or individuals are within range of the police officer's vehicle.

It is still another object to provide a video camera system which provides a 360 degree simultaneous video taping documentation for vehicle owners to serve as evidence of vehicle theft or police abuse that occur within range of the owner's vehicle.

It is yet another object to provide a video camera system which provides a 360 degree simultaneous video taping documentation for vehicle owners to serve as documentation of accidents and injuries and for related insurance purposes therefor that occur within range of the owner's vehicle.

Other objects will become readily apparent from the foregoing description and accompanying drawings in which:

BRIEF DESCRIPTION OF THE DRAWINGS

FIG. 1 is a top view of the present invention;

FIG. 2 is a view of the monitor along line 2 of FIG. 1;

FIG. 3 is a partial sectional view along lines 3—3 of FIG. 1;

FIG. 4 is a partial sectional view of line 4—4 of FIG. 3; and

FIG. 5 is an alternative embodiment of the invention in which the camera has a ring shaped or circular housing.

FIG. 6 is another alternative embodiment of the invention in which the camera has a cube shaped housing.

DETAILED DESCRIPTION OF THE PREFERRED EMBODIMENTS

Referring to the drawings, FIG. 1 shows a top view of the invention, a 360 degree video camera system inside of an automotive vehicle 1. The 360 degree camera system includes a camera housing 5, a multiplexer unit 15 and a video cassette recorder (VCR) 18 and optionally a monitor 19, as shown in FIGS. 1 and 2.

The camera housing 5, as shown in FIG. 3, can be mounted on the supporting mount 7 of the rear view mirror 8 of the automotive vehicle 1. As shown in FIG. 3, the camera housing 5 can be moved so that it can be retracted and placed behind the rear view mirror 8 in position A when not in use or extended below the rear view mirror 8 in position B when in use. A hinge mechanism 9 can articulately move the camera on its mount from position A to position B and vice verse. Alternatively other mechanical arrangements might be employed such as having the camera mount designed as a telescopic rod for extending and retracting the camera behind or below the rear view mirror respectively.

The camera housing 5 is preferably formed to accommodate a 4 Board CCD or a PC51 Series CMOS inline Microvideo Camera sold by Super Circuits, Inc., Leander, Tex., which is mounted on a 1 inch to 2 inch mount giving it a 360 degree view inside and outside the vehicle. These miniature video cameras can be black and white or color cameras. It is understood, however, that any other miniature camera system can be used and the invention is not limited to these specific examples.

There is a swivel unit for the camera housing which attaches to the rear view mirror.

The system includes preferably a 5 inch or 6 inch LCD video monitor for viewing the camera recorded images (FIG. 2). The monitor can be color or black and white and can flip up or down.

Wires run from the camera housing to the multiplexer which records with time and date, either in color or black and white, all four miniature video cameras at the same time. Then the wires run into a VCR which along with the miniature video cameras and multiplexer operate off the vehicle's battery 22, preferably by a wire harness (not shown) to which the wires for the miniature cameras, the multiplexer 15 and the VCR 18 run and from which the wire harness connects to the vehicle's battery 22.

Preferably, the camera housing 5 can be configured into any geometric shape and is not limited to the shapes described herein. FIGS. 3–5 shows the camera housing as a ring shaped or circular housing with lenses on each side. Preferably four miniature video cameras are provided on each side of the housing spaced 90 degrees apart but the number of cameras 11 can vary if desired. The miniature video cameras 11 provide the camera housing 5 with a 360 degree range for video recording everything around the camera housing 5, namely the interior of the automotive vehicle and the exterior of the automotive vehicle by recording through the windshield, side and rear windows of the automotive vehicle 1. The camera housing 5 and cameras 11 can run off the automotive vehicle's battery as shown in FIG. 1.

The system includes a multiplexer 15 and a VCR 18. The multiplexer 15 permits all the recorded view from each camera 11 of the camera housing 5 to be placed together to provide a 360 degree picture. Thus in a four camera arrangement, the multiplexer 15 provides for the four cameras images to be placed side by side by side by side for display as recorded in the VCR 18 and displayed in the monitor 19. The VCR 18 records these images. One suitable multiplexer 15 for the present invention is Model No. DPX4 for color video taping and Model No. MX4M for black and white video taping available from Advanced Technology Video Inc. of Redmond, Wash. Of course the present invention is not limited to any one particular multiplexer model.

The multiplexer 15 and the VCR 18 are placed together and preferably stacked one on top of the other either in the trunk 22 of the automotive vehicle as shown in FIG. 1 or in the glove compartment of the automotive vehicle (not shown).

The wiring between the camera housing 5, the mutiplexer 15 and VCR 18 and optionally the monitor 19 can be placed behind the panels of the sidewalls, roof nd dashboard of the vehicle as shown in FIG. 1 to keep the installation of the present invention less intrusive and the wiring concealed for aesthetic appearances. The monitor 19, VCR 18 and the multiplexer 15 can also run off the automotive vehicle's battery 22. Thus, preferably, all four video cameras 11, the multiplexer 15 and the VCR 19 have wires running to a wire harness which is connected to the vehicle's battery 22. Alternatively any other power supply can be provided such as batteries for the camera, multiplexer and VCR.

Although the invention is described in particular for use in automotive vehicles, it can also be utilized in other vehicles involving but not limited to aircrafts, boats, trains, etc.

While presently preferred embodiments have been described for purposes of the disclosure, numerous changes in the arrangement of method steps and apparatus parts can be made by those skilled in the art. Such changes are encompassed within the spirit of the invention as defined by the appended claims.

What is claimed is:

1. A non-rotational, unitary video system for an automotive vehicle, comprising:
    a camera housing located inside an automotive vehicle including a plurality of cameras,
    located on each side of housing to provide a 360° range for simultaneous video recording of images received by said lenses, said camera housing being separate from a rear view mirror housing and each of said cameras being located apart from each other;
    a video multiplexer for multiplying all recorded video images by said cameras; and
    a video camera recorder for recording image multiplexed by said multiplexer thereby providing a recording of a environment surrounding said camera housing.

2. The video system according to claim 1 wherein said camera housing is shaped circularly and each of said cameras is located 90 degrees apart from each other.

3. The video system according to claim 1 wherein said camera housing is cube shaped and each side surface of said cube shaped camera housing has a lens therein.

4. The video system according to claim 1 wherein said video cassette recorder and said multiplexer are located in a glove compartment inside said automotive vehicle.

5. The video system according to claim 1 wherein said video cassette recorder and said multiplexer are located in a trunk of said automotive vehicle.

6. The video system according to claim 1 wherein said camera housing is located behind a rear view mirror of said automotive vehicle and is adapted to extend below said rear view mirror.

7. The video system according to claim 1 wherein said camera housing has a hinge mechanism adapted to fold behind said rear view mirror when not in use.

8. A method for video taping within an automotive vehicle, the steps comprising:
    locating a non-rotational, unitary camera housing inside an automotive vehicle including a plurality of cameras located on each side of said housing to provide a range for simultaneous video recording of images received by said lenses, said camera housing being separate from a rear view mirror housing and each of said cameras being located apart from each other;
    multiplexing all recorded video images by said cameras by means of a multiplexer; and
    recording image multiplexed by said multiplexer by means of a video cassette recorder thereby providing a recording of a environment surrounding said camera housing.

9. A method for video taping within an automotive vehicle, the steps comprising:
    locating a non-rotational, unitary camera housing inside an automotive vehicle including a plurality of cameras located on each side of said housing to provide a ° range for simultaneous video recording of images received by said lenses, said camera housing being separate from a rear view mirror housing and each side of said camera housing has a lens therein;
    multiplexing all recorded video images by said cameras by means of a multiplexer; and
    recording image multiplexed by said multiplexer by means of a video cassette recorder thereby a providing a recording of a 360° environment surrounding said camera housing.

10. A method for video taping within an automotive vehicle, the steps comprising:
    locating a camera housing inside an automotive vehicle including a plurality of cameras located on each side of said housing to provide a 360° range for video recording images received by said lenses, said camera housing being separate from a rear view mirror, and being located behind said rear view mirror and being adapted to extend below said rear view mirror;
    multiplexing all recorded video images by said cameras by means of a multiplexer; and
    recording image multiplexed by said multiplexer by means of a video cassette recorder thereby a providing a recording of a 360° environment surrounding said camera housing.

11. A method for video taping within an automotive vehicle, the steps comprising:
    locating a camera housing inside an automotive vehicle including a plurality of cameras located on each side of said housing to provide a 360° range for video recording images received by said lenses, said camera housing having a hinge mechanism adapted to fold behind said rear view mirror when not in use;
    multiplexing all recorded video images by said cameras by means of a multiplexer; and recording image multiplexed by said multiplexer by means of a video cassette recorder thereby a providing a recording of a 360° environment surrounding said camera housing.

12. A non-rotational, unitary video system for an automotive vehicle, comprising:
   a camera housing located inside an automotive vehicle including a plurality of cameras, located
   on each side of housing to provide a 360° range for simultaneous video recording of images received by said lenses, said camera housing being separate from a rear view mirror housing and each side of said camera housing has a lens therein;
   a video multiplexer for multiplying all recorded video images by said cameras; and
   a video camera recorder for recording image multiplexed by said multiplexer thereby providing a recording of a 360° environment surrounding said camera housing.

13. A video system for an automotive vehicle, comprising:
   a camera housing located inside an automotive vehicle including a plurality of cameras, located on each side of housing to provide a range for video recording of images received by said lenses, said camera housing being separate from a rear view mirror, and being located behind said rear view mirror and being adapted to extend below said rear view mirror;
   a video multiplexer for multiplying all recorded video images by said cameras; and
   a video camera recorder for recording image multiplexed by said multiplexer thereby a providing a recording of a 360° environment surrounding said camera housing.

14. A video system for an automotive vehicle, comprising:
   a camera housing located inside an automotive vehicle including a plurality of cameras, located on each side of housing to provide a 360° range for video recording of images received by said lenses, said camera housing having a hinge mechanism adapted to fold behind said rear view mirror when not in use;
   a video multiplexer for multiplying all recorded video images by said cameras; and
   a video camera recorder for recording image multiplexed by said multiplexer thereby a providing a recording of a 360° environment surrounding said camera housing.

15. The video system of claim 1 wherein said camera housing is shaped circularly.

16. The video system of claim 1 wherein said camera housing is cube shaped.

17. The method of claim 9 wherein said camera housing is shaped circularly.

18. The method of claim 9 wherein said camera housing is cube shaped.

* * * * *